(12) United States Patent
Saad et al.

(10) Patent No.: US 11,960,623 B2
(45) Date of Patent: Apr. 16, 2024

(54) INTELLIGENT AND REVERSIBLE DATA MASKING OF COMPUTING ENVIRONMENT INFORMATION SHARED WITH EXTERNAL SYSTEMS

(71) Applicant: EMC IP Holding Company LLC, Hopkinton, MA (US)

(72) Inventors: Yossef Saad, Ganei Tivka (IL); Alex Solan, Hertzelia (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 16/832,905

(22) Filed: Mar. 27, 2020

(65) Prior Publication Data

US 2021/0334406 A1  Oct. 28, 2021

(51) Int. Cl.
*G06F 21/62* (2013.01)
*G06F 16/14* (2019.01)
(Continued)

(52) U.S. Cl.
CPC ........ *G06F 21/6254* (2013.01); *G06F 16/148* (2019.01); *G06F 16/156* (2019.01);
(Continued)

(58) Field of Classification Search
CPC .. G06F 21/6254; G06F 16/148; G06F 16/156; G06F 16/182; G06F 21/602; G06F 21/6227; G06F 16/215
See application file for complete search history.

(56) References Cited

U.S. PATENT DOCUMENTS 6,223,202 B1 * 4/2001 Bayeh .................. G06F 9/5027
718/1
6,931,532 B1 * 8/2005 Davis .................. G06F 21/6209
705/76
(Continued)

FOREIGN PATENT DOCUMENTS

BR  PI0401894 B1 * 11/2018
CN  104090891 B  * 5/2016  ....... G06F 17/30091
(Continued)

OTHER PUBLICATIONS

Osama Ali; Abdelkader Ouda, A classification module in data masking framework for Business Intelligence platform in healthcare, IEEE, A classification module in data masking framework for Business Intelligence platform in healthcare, 8 pages (Year: 2016).*

(Continued)

*Primary Examiner* — Shahriar Zarrineh
(74) *Attorney, Agent, or Firm* — Dergosits & Noah LLP; Todd A. Noah

(57) ABSTRACT

Described is a system for intelligent and reversible data masking of computing environment information shared with an external system. The system may leverage a secure masking agent that acts as an intermediary between a computing system (or environment) and an analytics component. The masking agent may provide real-time reversible data masking that ensures that sensitive information is not exposed outside of a secure (e.g. on-premises) environment, while at the same time ensuring the analytics component receives sufficient contextual information to perform a detailed analysis with the shared information. For example, the system may identify and mask identifying information of a particular server or host, while still retaining certain contextual information such as a network topology.

20 Claims, 5 Drawing Sheets

(51) Int. Cl.
*G06F 16/182* (2019.01)
*G06F 21/60* (2013.01)

(52) U.S. Cl.
CPC .......... *G06F 16/182* (2019.01); *G06F 21/602* (2013.01); *G06F 21/6227* (2013.01)

(56) References Cited

U.S. PATENT DOCUMENTS

| | | | |
|---|---|---|---|
| 6,944,759 B1* | 9/2005 | Crisan | G06F 8/65 702/182 |
| 7,219,081 B1* | 5/2007 | Davis | G06Q 30/08 705/37 |
| 8,024,339 B2* | 9/2011 | Barker | G06F 21/6245 707/736 |
| 8,407,482 B2* | 3/2013 | Ghosh | H04L 61/30 713/189 |
| 8,544,090 B1* | 9/2013 | Chen | G06F 11/00 713/188 |
| 8,661,423 B2* | 2/2014 | Agrawal | G06F 21/566 707/706 |
| 8,924,401 B2* | 12/2014 | Raj | H04L 9/0894 707/783 |
| 8,949,966 B2* | 2/2015 | Lottin | H04L 67/56 726/2 |
| 9,083,729 B1* | 7/2015 | Doshi | H04L 63/1408 |
| 9,087,215 B2* | 7/2015 | LaFever | H04L 63/0407 |
| 9,100,183 B2* | 8/2015 | Movshovitz | H04L 9/0662 |
| 9,230,132 B2* | 1/2016 | Gkoulalas-Divanis | G06F 21/6227 |
| 9,298,941 B2* | 3/2016 | Stofberg | G06F 21/6218 |
| 9,356,942 B1* | 5/2016 | Joffe | H04L 63/1408 |
| 9,443,104 B2* | 9/2016 | Rozenberg | G06F 16/9535 |
| 9,461,817 B2* | 10/2016 | Moore | H04L 9/08 |
| 9,674,154 B1* | 6/2017 | Canavor | H04W 12/02 |
| 9,785,891 B2* | 10/2017 | Agarwal | G06Q 30/016 |
| 9,886,587 B2* | 2/2018 | Kamishiro | G06F 21/608 |
| 10,032,046 B1* | 7/2018 | Hayashi | H04L 63/0245 |
| 10,095,883 B2* | 10/2018 | Antonatos | G06F 11/3006 |
| 10,586,209 B2* | 3/2020 | Thorpe | G06Q 10/10 |
| 10,635,657 B1* | 4/2020 | Prakash | G06F 16/27 |
| 10,719,627 B2* | 7/2020 | Maier | G06N 20/00 |
| 10,733,323 B2* | 8/2020 | Ford | H04L 67/535 |
| 10,855,661 B2* | 12/2020 | Crowther | G06F 21/44 |
| 2003/0055931 A1* | 3/2003 | Cravo De Almeida | H04L 63/04 709/223 |
| 2006/0005067 A1* | 1/2006 | LIyod, Jr. | G06F 11/3414 714/E11.193 |
| 2006/0253554 A1* | 11/2006 | Uwais | G06F 21/73 710/36 |
| 2007/0245027 A1* | 10/2007 | Ghosh | H04L 61/30 709/228 |
| 2007/0260997 A1* | 11/2007 | Braun | G06F 3/0481 715/781 |
| 2009/0281974 A1* | 11/2009 | Saxena | G06N 3/042 706/14 |
| 2010/0122327 A1* | 5/2010 | Linecker | H04L 63/18 726/6 |
| 2011/0153583 A1* | 6/2011 | Goldband | G06F 16/9566 707/723 |
| 2012/0259877 A1* | 10/2012 | Raghunathan | G06F 21/6254 707/757 |
| 2013/0086010 A1* | 4/2013 | Wenzel | G06F 11/076 707/E17.005 |
| 2013/0167192 A1* | 6/2013 | Hickman | G06F 21/6245 726/1 |
| 2013/0254756 A1* | 9/2013 | Kroeselberg | G06F 8/65 717/171 |
| 2014/0019586 A1* | 1/2014 | Saxena | G11C 7/1009 709/217 |
| 2014/0047551 A1* | 2/2014 | Nagasundaram | H04L 63/107 726/26 |
| 2014/0051499 A1* | 2/2014 | Hamlin | G07F 17/3244 463/25 |
| 2015/0007249 A1* | 1/2015 | Bezzi | G06F 21/6227 726/1 |
| 2015/0067473 A1* | 3/2015 | Tuteja | G06F 40/14 715/234 |
| 2015/0150139 A1* | 5/2015 | Pauquet | G06F 16/31 707/755 |
| 2015/0169540 A1* | 6/2015 | Saxena | G06F 16/93 707/755 |
| 2015/0169895 A1* | 6/2015 | Gkoulalas-Divanis | G06F 21/6227 726/26 |
| 2015/0229613 A1* | 8/2015 | Baum | G06F 9/4488 713/171 |
| 2015/0324607 A1* | 11/2015 | Mushkatblat | G06F 21/6254 726/26 |
| 2016/0269417 A1* | 9/2016 | Saxena | H04L 63/06 |
| 2016/0379010 A1* | 12/2016 | Farkash | G06F 21/6245 726/1 |
| 2017/0011053 A1* | 1/2017 | Hubbard | H04L 67/52 |
| 2017/0076100 A1* | 3/2017 | Buddepalli | G06F 21/629 |
| 2017/0104756 A1* | 4/2017 | Rosenthal | H04L 63/20 |
| 2017/0339111 A1* | 11/2017 | Balabine | H04L 63/0428 |
| 2018/0173897 A1* | 6/2018 | Mushkatblat | G06F 21/6254 |
| 2018/0218166 A1* | 8/2018 | Cachin | G06F 21/6254 |
| 2018/0314853 A1* | 11/2018 | Oliner | G06F 21/6254 |
| 2019/0080022 A1* | 3/2019 | Matsuo | G06F 16/90335 |
| 2019/0180053 A1* | 6/2019 | Angara | G06F 21/6254 |
| 2019/0190890 A1* | 6/2019 | Druker | G06F 21/6245 |
| 2019/0197174 A1* | 6/2019 | Kim | G06F 16/258 |
| 2019/0235856 A1* | 8/2019 | Zhang | G06F 21/602 |
| 2019/0236303 A1* | 8/2019 | Manadhata | H04L 9/3297 |
| 2019/0303967 A1* | 10/2019 | Wijaya | H04L 67/306 |
| 2019/0332806 A1* | 10/2019 | Yevgeniya | G06F 21/6245 |
| 2019/0335327 A1* | 10/2019 | Al-Kabra | G06F 16/9566 |
| 2019/0372940 A1* | 12/2019 | McDougall | H04L 63/0421 |
| 2020/0076104 A1* | 3/2020 | Sommerville | G06F 21/6227 |
| 2020/0076777 A1* | 3/2020 | Sipcic | H04L 67/562 |
| 2020/0092265 A1* | 3/2020 | Sivakumar | G06N 20/00 |
| 2020/0127953 A1* | 4/2020 | Maddipati | H04L 51/42 |
| 2020/0226282 A1* | 7/2020 | Takagi | G16H 30/20 |
| 2020/0311304 A1* | 10/2020 | Parthasarathy | G06F 11/3006 |
| 2021/0056561 A1* | 2/2021 | Pavlov | H04L 67/535 |
| 2021/0203642 A1* | 7/2021 | Mantin | H04L 61/301 |
| 2022/0103556 A1* | 3/2022 | Boliek | H04L 63/0815 |

FOREIGN PATENT DOCUMENTS

| | | | | |
|---|---|---|---|---|
| CN | 111143651 A | * | 5/2020 | |
| CN | 111193632 A | * | 5/2020 | H04L 43/00 |
| EP | 3136284 A1 | * | 3/2017 | G06F 21/6254 |
| EP | 3179434 A1 | * | 6/2017 | |
| JP | 2000148463 A | * | 5/2000 | |
| JP | WO2008093400 A1 | * | 5/2010 | |
| JP | WO2012067213 A1 | * | 5/2014 | |
| JP | 6355577 B2 | * | 7/2018 | |
| KR | 20150131957 A | * | 11/2015 | |
| WO | WO-2010127216 A2 | * | 11/2010 | G06F 21/566 |
| WO | WO-2013032451 A1 | * | 3/2013 | G06Q 30/0201 |
| WO | WO-2010127216 A2 | * | 11/2014 | |

OTHER PUBLICATIONS

B K Siddartha, Analysis of Masking Techniques to Find out Security and other Efficiency Issues in Healthcare Domain, IEEE, Proceedings of the Third International Conference on I-SMAC (IoT in Social, Mobile, Analytics and Cloud) (I-SMAC 2019) IEEE Xplore Part No. CFP19OSV-ART; ISBN:978-1-7281-4365-1 (Year: 2019).*
Mohammed Al-Zobbi, Sensitivity-Based Anonymization of Big Data, 2016 IEEE 41st Conference on Local Computer Networks Workshops, School of Computing, Engineering & Mathematics. Western Sydney University, NSW, Australia, 7 pages (Year: 2016).*
Suntherasvaran Murthy, A Comparative Study of Data Anonymization Techniques, 2019 IEEE 5th Intl Conference on Big Data Security on Cloud (BigDataSecurity), IEEE Intl Conference on

(56) References Cited

OTHER PUBLICATIONS

High Performance and Smart Computing (HPSC), and IEEE Intl Conference on Intelligent Data and Security (IDS), 4 pages. (Year: 2019).*

Navoda Senavirathne, On the Role of Data Anonymization in Machine Learning Privacy, 2020 IEEE 19th International Conference on Trust, Security and Privacy in Computing and Communications (TrustCom), 12 pages (Year: 2020).*

* cited by examiner

INTELLIGENT AND REVERSIBLE DATA MASKING OF COMPUTING ENVIRONMENT INFORMATION SHARED WITH EXTERNAL SYSTEMS

TECHNICAL FIELD

This disclosure relates to computer reporting and analysis systems, and more particularly, performing data masking when sending data to an external data analysis system.

BACKGROUND

As part of operating and managing enterprise computing systems, customers often utilize third-party reporting and analysis systems. These reporting and analysis systems interact with components of a computing environment to obtain various types of data such as configuration settings, operational statistics, and logs to analyze the of functioning the computing environment. Upon performing an analysis using such data, various reports and insights may be provided detailing the operation of the computing environment including recommended changes to the environment to potentially further optimize performance. Accordingly, such reporting and analysis systems may be implemented using various tools that may include software installed within the computing system, or may be provided as a cloud-based (or on-demand) service (e.g. software-as-a-service (SaaS)). However, the challenge with cloud-based services is that it requires customers to share information of their computing environments to external systems (e.g. public cloud). Accordingly, customers often perceive such an implementation as creating a potential security threat. For example, providing detailed computing environment information to an external system may expose such information to a malicious party. The malicious party may then leverage such information to exploit the computing environment. Accordingly, customers are often hesitant to embrace such cloud-based systems despite providing several efficiency advantages. Thus, there is a continued need to ensure the security of computing environment information provided to cloud-based reporting and analysis systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
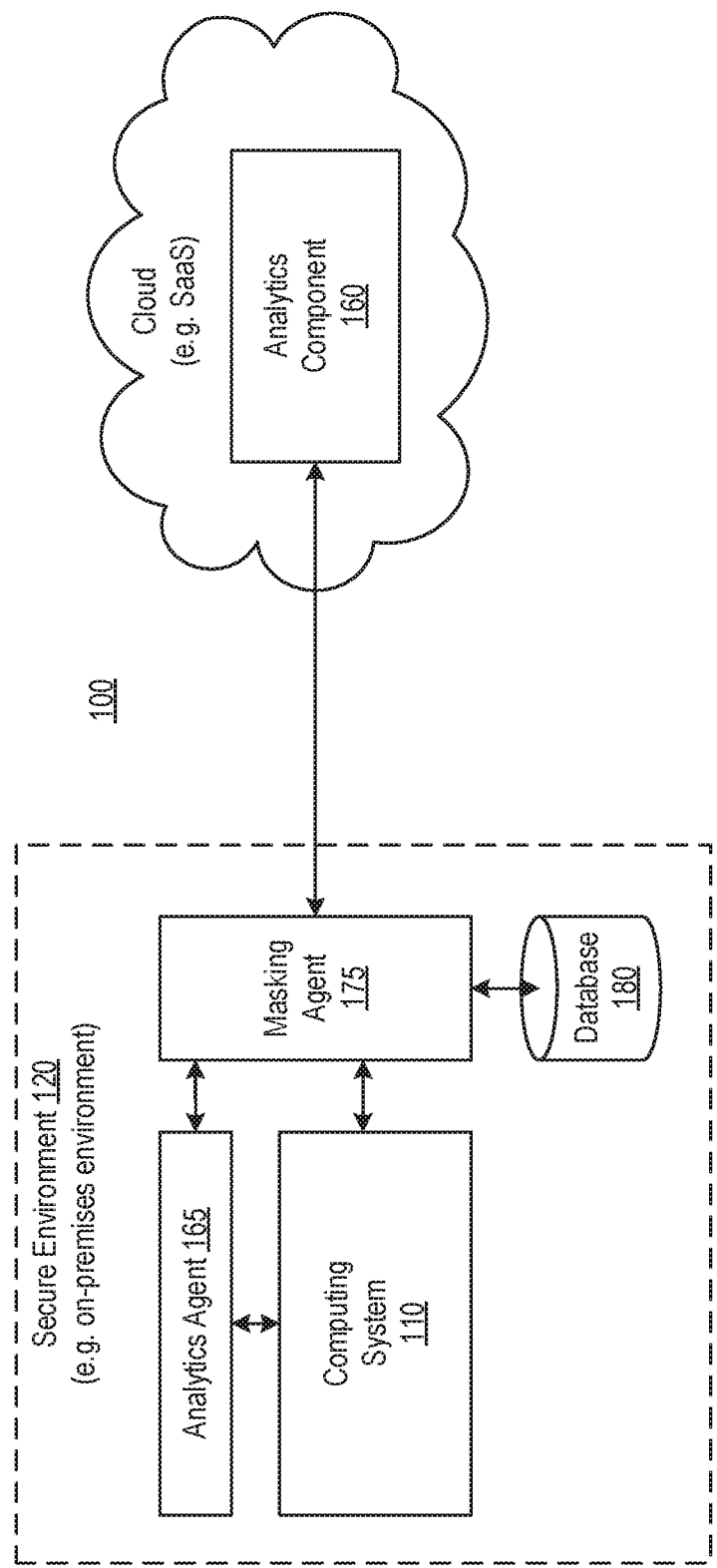
FIG. 1 is a block diagram illustrating an example operating environment for intelligently masking sensitive information according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for intelligent and reversible data masking of computing environment information shared with an external system. For example, the system may mask potentially sensitive computing environment information shared with a cloud-based (e.g. SaaS) reporting and analysis system. In some embodiments, the system may leverage a secure masking agent that acts as an intermediary between a computing system (or environment) and a cloud-based analytics component. For example, the masking agent may provide real-time reversible data masking that ensures that sensitive information is not exposed outside of a secure (e.g. on-premises) environment, while at the same time preserving certain contextual information to allow a detailed analysis of the shared information. For example, in some embodiments, the system may automate an intelligent process for identifying sensitive information and mask portions of information that may be exploited by a malicious party, while still retaining certain valuable information. For example, the system may identify and mask identifying information of a particular server or host, while still retaining certain contextual information such as a type of server, or the associated subnetwork of the host. Moreover, the system may reverse the masking to allow reports from the analytics component to be interpreted directly.

To provide such a capability, the system may obtain collected data of a computing system that is to be shared with an analytics component, and parse the collected data to identify sensitive information. In some embodiments, the system may identify portions of the sensitive information such as portions corresponding to contextual information and portions corresponding to identifying information of a component. For example, the system may mask such portions separately to prevent exposure of a particular server, but preserve contextual information such as a network topology. Accordingly, the system may mask the collected data by replacing the portions of sensitive information individually with an anonymized value. The system may also retain the sensitive information by storing the sensitive information with the associated anonymized values in a secure database to reverse the process. The system may then share the masked data including the anonymized values with the analytics component, and in response, receive an analysis report referencing the anonymized value. Accordingly, the anonymized values, and not the sensitive information, are exposed to the analytics component during the analysis process. The system may then unmask the analysis report, if necessary, by replacing the referenced anonymized values with the associated sensitive information retrieved from the database.

Accordingly, in some embodiments, the system may introduce intelligence into a data masking process while still maintaining the integrity of the data provided for analysis.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection system operating environment that includes a storage system or storage environment including primary storage and data protection storage. For example, at least some functionality may be provided by, or implemented in connection with, various platforms such as the Dell-EMC DataDomain data protection platform, and associated systems, methods, and components, although use of this particular platform is provided only by way of illustration and is not required.

In some embodiments, the storage environment may take the form of a cloud environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications.

Any of the systems or devices, including the clients, servers and hosts, in the operating environment can take the form of software, physical machines, or virtual machines (VM), or could be implemented as a Function-as-a-Service (FaaS), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), or could be implemented as a Function-as-a-Service (FaaS), though no particular component implementation is required for any embodiment. Where VMs are employed, a hypervisor or other virtual machine monitor (VMM) can be employed to create and control the VMs.

FIG. 1 is a block diagram illustrating an example of an operating environment 100 for intelligently masking sensitive information according to one or more embodiments of the disclosure.

As shown, the environment 100 may include a computing system 110, masking agent 175, database 180, an analytics agent 165, and an analytics component 160. In some embodiments, an entity associated with the computing system 110 may be associated with a third-party reporting and analytics service associated with the analytics component 160 and the analytics agent 165. For example, the analytics component 160 may be provided as a cloud-based software-as-a-service (e.g. SaaS), and work in conjunction with the analytics agent 165. Accordingly, in some embodiments, the cloud-based provider of the computing system 110 may be different than the cloud-based provider of the analytics component 160. It should be noted that the components of operating environment 100 may interact via a network, which may be any type of wired or wireless network including a local area network (LAN), a wide area network (WAN), or a direct communication link, or other suitable connection.

As shown, certain components of operating environment 100 may be provided within a secure environment 120. In some embodiments, a secure environment 120 may refer to an on-premises (or production) environment that is secured with one or more servers (or hosts, clients, device, etc.), a network (e.g. private network), a sandbox, or any other configuration, which may be (fully or partially) part of a virtual environment (e.g. cloud-based environment). For example, the computing system 110 may be hosted on one or more secure VMs provided as a part of a cloud-based computing environment.

In some embodiments, the computing system 110 may include a computing environment (or system) that may include one or more components such as VMs, servers, storage components, networking components, databases, and host one or more applications. However, in some embodiments, the computing system 110 may refer to a particular component such as a computing device, network component, storage device, or other type of component. In some embodiments, the computing system 110 may also refer to a software platform or application. In some embodiments, the computing system 110 may perform various operations to provide data protection and recovery services. For example, the computing system 110 may represent one or more components of a Data Domain™ Restorer (DDR)-based deduplication storage system provided by Dell EMC Corporation.

Irrespective of a particular configuration, the computing system 110 may be a source of data to be analyzed. For example, any data relevant to the functioning of the computing system 110 may be collected and sent to the analytics component 160 for analysis. However, before the data is shared with the analytics component 160, the masking agent 175 may process the data as further described herein.

The analytics component 160 may perform an analysis based on data collected from the computing system 110. In some embodiments, the analysis may be provided in the form of a report that is shared with the computing system 110. For example, the report may include particular metrics associated with certain components (e.g. servers, networks, applications, etc.) of the computing system 110. For example, the metrics may include information related to processing (e.g. processing load, time, usage, etc.), storage (e.g. efficiency, capacity, response time, access time), networks (e.g. bandwidth), power consumption, load balancing, and any other metrics that may be used to provide insights on the functioning or configuration of the computing system 110.

The analytics agent 165 may work in conjunction with the analytics component 160 to obtain relevant data. For example, the analytics agent 165 may reside (e.g. installed) on the computing system 110, or work in conjunction with the computing system 110 by residing within the secure environment 120 of the computing system. Accordingly, the analytics agent 165 may be given limited access to the computing system 110 to perform functions related to data collection and analysis reporting. For example, the analytics agent 165 may receive an analysis report from the analytics component 160 to be presented within the secure environment 120.

The masking agent 175 may act as an intermediary between the computing system 110/analytics agent 165 and the analytics component 160. For example, the masking agent 175 may act as a gateway that performs intelligent data masking of potentially sensitive information shared with an external component such as the analytics component 160. In addition, the masking agent 175 may perform unmasking of analysis reports provided by the analytics component 160.

The database 180 may be managed by the masking agent 175 as part of the masking mechanism. For example, to provide the ability to reconstruct the masked data, the masking agent 175 may store the sensitive information in the database 180. The database 180 may be any type of database (or data structure) that may store information and maintain associations between the sensitive information and the corresponding anonymized data which is used as a substitute for the sensitive information. For example, the database 180 may use using key-value table (or any other store) such that the appropriate sensitive information may be retrieved using the associated anonymized value. To maintain the security of the sensitive information, the database 180 may reside within the secure environment 120. In addition, in some embodiments, only the masking agent may be authorized to access the database 180.

In some embodiments, the masking agent 175 may coordinate (or manage, orchestrate, execute, automate, etc.) various operations (or processes, methods, etc.) for providing the data masking mechanism. For example, the masking agent 175 may direct (or control, initiate, etc.) other components of the operating environment 100 to perform various operations as further described herein. In some embodiments, the masking agent 175 may provide an interface that allows a user (e.g. security administrator) to perform various operations such as configuring the masking policy (e.g. privacy level) implemented by the masking agent 175. As described, the masking agent 175 may be provided as a cloud-based service. However, the masking agent 175 may also be part of the computing system 110, a separate device, or a combination thereof.

Accordingly, the masking mechanism may include an interaction between the computing system 110 (and analytics agent 165), masking agent 175, and the analytics component 160 as further described with reference to FIG. 2.

Figure 2:
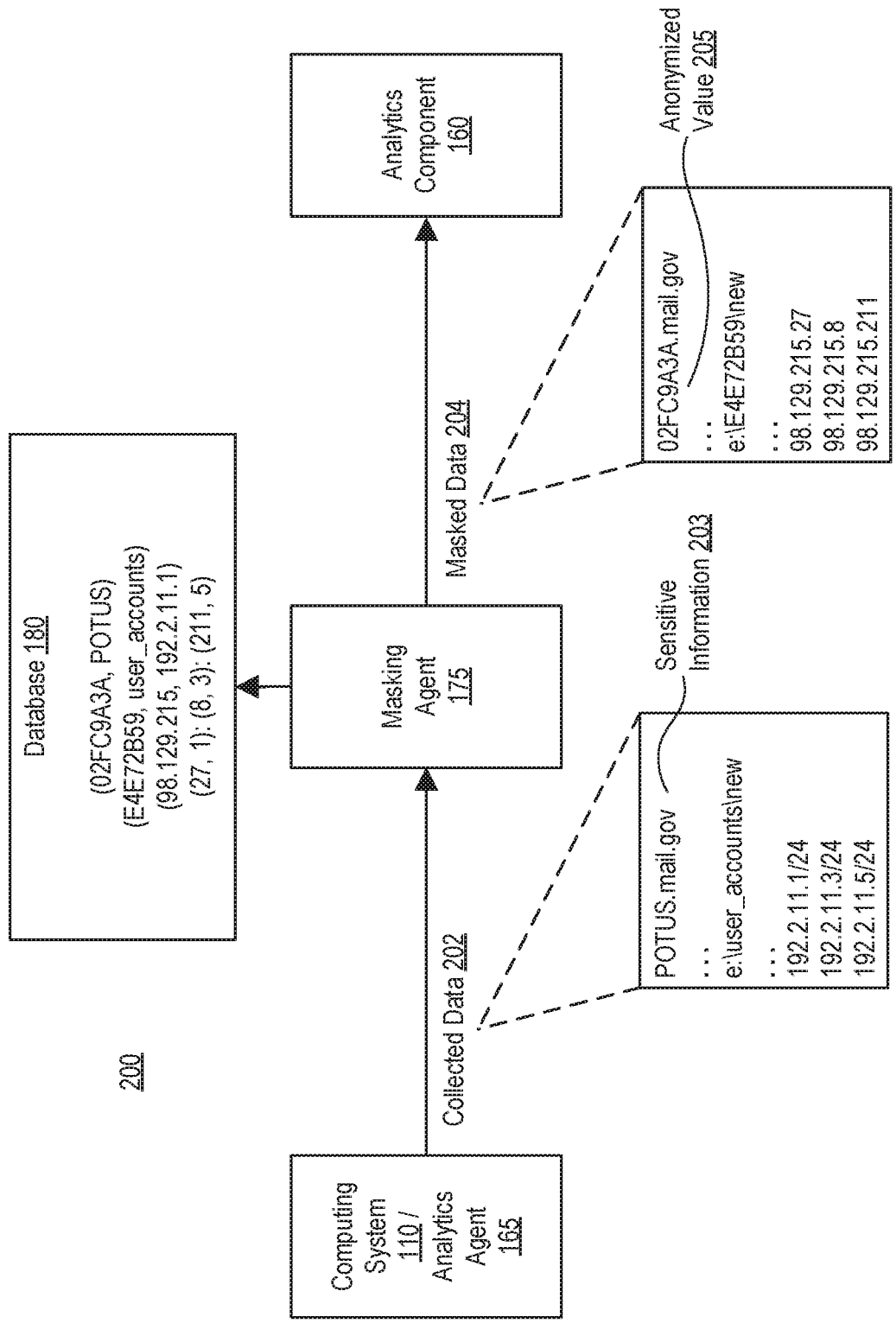
FIG. 2 is a flow diagram illustrating an example interaction between components when performing an intelligent masking of sensitive information according to one or more embodiments of the disclosure.

FIG. 2 is a flow diagram 200 illustrating an example interaction between components when performing an intelligent masking of sensitive information according to one or more embodiments of the disclosure.

As shown, the computing system 110 and/or analytics agent 165 may provide collected data 202 to the masking agent 175. The collected data 202 may include any information associated with the functioning or configuration of components of the computing system 110 such as computers or devices, servers, networks, CPUs, storage, files and directories, etc. For example, the collected data 202 may include configuration settings, operational statistics, data logs, network topology, user accounts and settings, and any other types of information.

In some embodiments, the analytics agent 165 may be authorized to access or obtain such information as the analytics agent 165 may reside within the secure environment (e.g. secure environment 120). However, when sharing the collected data to external components such as the analytics component 160, which may reside in a public cloud, the system may address potential security concerns by using the masking agent 175 as an intermediary.

Accordingly, before being shared with the analytics component 160, the masking agent may obtain (or intercept, obtain, receive, acquire, etc.) the collected data 202, and perform a processing to remove information that may potentially be exploited by a malicious party while still retaining valuable contextual information required for the analysis component 160 to perform a thorough analysis. In other words, the masking agent 175 may perform an intelligent masking of the collected data 202. To perform such intelligent masking, the masking agent 175 may parse the collected data 202 and identify sensitive information 203. The sensitive information 203 may include various types of information such as names, addresses, network typology information, account information, location, or the other types of information that may be exploited.

In some embodiments, the name of a component (e.g. device, server, host, storage, file, directory, etc.) may be deemed as potentially sensitive. For example, the name of particular component may be deemed sensitive because revealing the name may provide a malicious party with information regarding potentially important or high value targets for exploitation. For instance, as shown is this example, the collected data 202 may include the name of a particular important mail server ("POTUS.mail.gov"). Accordingly, the masking agent 175 may deem the particular server name as sensitive information 203 and "mask" the server name by replacing (or substituting) the name with an anonymized value 205. For instance, in this example, the server name ("POTUS") may be masked with a partial hash value ("02FC9A3A"). As described, in some embodiments, not all of the server information may be masked (or obfuscated), and instead, some relevant contextual information may be retained. For instance, in the above example, only the particular server name ("POTUS") was masked and the indication of the type of server ("mail") was retained. Accordingly, the masking was performed in an intelligent manner allowing the analytics component 160 to be aware that the particular component is a mail server. Accordingly, the analysis may still be performed with the knowledge that the server is a mail server despite not knowing the particular instance (or name) of the server.

As described, names of other components such as filename and directories may also be masked. For instance, as shown as another example, the masking agent 175 may identify a particular directory name ("user_accounts") as sensitive information 203, and accordingly, may replace the directory name with an anonymized value 205 ("E4E72B59").

In addition, the masking agent 175 may also identify an addresses (e.g. IP address, MAC address, etc.) of a particular component (e.g. server, host, storage, etc.) as potentially sensitive information 203. As described, the masking agent 175 may retain the contextual information that may be useful for the analytics component 160. For example, the masking agent 175 may retain information used to derive relationships between components such as components being part of the same network or subnetwork (e.g. network topology). For example, a portion (e.g. prefix) of an addresses may share an anonymized value 205 to indicate components are part of the same network or subnetwork. For instance, as shown in this example, the masking agent 175 may identify an IP address ("192.2.11.1/24" or 192.2.11.1 with subnet 255.255.255.0) of a component as sensitive information 203. However, as shown, in some embodiments, the masking agent 175 may mask particular components of the IP address such as the network identifier, subnet identifier, and/or the host identifier separately. For instance, for the three IPs addresses in this example, the masking agent 175 may separate the subnetwork ("192.2.11.0") from the host identifiers ("1", "3", and "5"). Accordingly, the shared subnetwork may be replaced by the same anonymized value 205 ("98.129.215") and each host identifier may have a unique anonymized value 205 to indicate the three different hosts (e.g. "27", "8", and "211"). Accordingly, the network topology may be maintained and the analytics component 160 may infer the three devices are part of the same network. It should be noted that a similar approach may be used for various other types of addresses. For example, for IPv6 (Internet Protocol version 6), link-local address may have a particular prefix (e.g. fe80::/64), and differ with respect to the last 64 bits. Accordingly, a prefix may be shared (e.g. retained or masked using the same value) and the last 64 bits may be masked for each address with an anonymized value 205.

The anonymized value 205 may be created using any technique for anonymizing (or masking obfuscating, hiding, etc.) a value. For example, the anonymized value 205 may be created from a hash value, randomly-created translation table, symmetrical encryption, or other technique that may be reversed.

As shown, the anonymized value 205 and the corresponding (or associated) sensitive information 203 may be stored in the database 180. For example, as shown, the anonymized value 205 and sensitive information 203 may be associated with each other by being stored as a key-value pair (e.g. anonymized value-sensitive information pair) in the database 180. It should be noted that any type of data structure or technique may be used to store the sensitive information 203 in the database 180 and associate the sensitive information 203 with the corresponding anonymized value 205. The database 180 may also be secured in various way. For example, the database 180 may be encrypted with only the masking agent 180 (and/or computing system 110) having access to a decryption key. In addition, in some embodiments, only the masking agent 175 may have access to the database 180.

Accordingly, once the masking agent 175 has processed (e.g. masked) the collected data 202, the masked data (or masked collected data) 204 may be shared (e.g. sent, transmitted, provided, etc.) to the analytics component 160. For example, the masked data 204 may include all of the collected data 202 after replacing the sensitive information 203 with the anonymized values 205. Once the masked data 204 is received by the analytics component 160, an analysis of the computing system 110 may be performed and an analysis report may be created. In some embodiments, the analysis report may reference the anonymized values, and accordingly, the analysis report may be processed to unmask the sensitive information. For example, the masking agent 175 may unmask the analysis report as further described with reference to FIG. 3.

Figure 3:
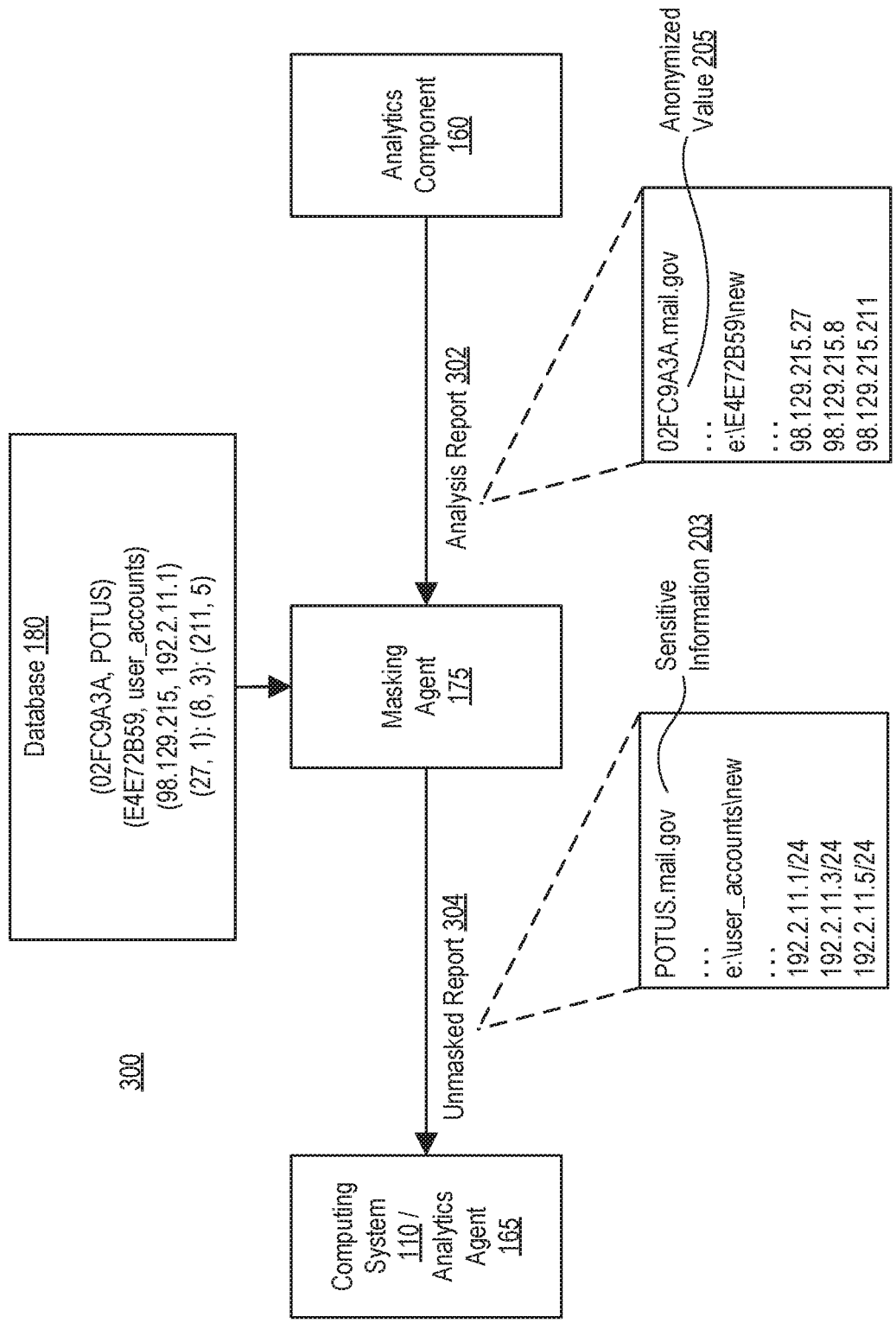
FIG. 3 is a flow diagram illustrating an example interaction between components when performing an unmasking of sensitive information according to one or more embodiments of the disclosure.

FIG. 3 is a flow diagram 300 illustrating an example interaction between components when performing an unmasking of sensitive information according to one or more embodiments of the disclosure.

As shown, the analytics component 160 may create an analysis report (or report) 302 based on the data collected from the computing system 110. Accordingly, the analytics component 160 may provide (e.g. share, send, transmit, etc.) the report 302 to the computing system 110/analytics agent 165, via the masking agent 175. For example, the report 302 may include various information and metrics related to the functioning and operation of the computing system 110. In some embodiments, the report may be in the form of a dashboard (e.g. web-based interface). In some embodiments, the report 302 may include various metrics and information related to specific components of the computing system 110, which may be referenced with the anonymized values (e.g. anonymized values 205). For instance, in this example, the report may include metrics associated with mail servers including the masked (or partially masked) mail server ("02FC9A3A.mail.gov). Accordingly, if a malicious party were to gain unauthorized access to such report, the malicious party may not be able to derive the particular mail server referenced, let alone, determine the particular mail server is a potentially high value target. It should be noted that the system may perform masking in a manner to not indicate that only masked components are potential high value targets. For example, the system may mask all names, or include additional randomized components so as to not indicate that only the masked components are potentially high value.

Accordingly, once the report 302 is provided by the analytics component 160, the masking agent 175 may process the report 302 to unmask the anonymized values to create an unmasked report 304 that is provided (or shared, sent, transmitted, etc.) to the computing system 110, analytics agent 165, or an associated user thereof. For example, the masking agent 175 may identify each anonymized value 205 referenced in the report (e.g. by matching values contained in the database 180), and retrieve (e.g. lookup) the corresponding sensitive information 203. Accordingly, each anonymized value 205 in the report may be replaced with the corresponding sensitive information 203 to create an unmasked report 304. As a result, the unmasked report 304 may be interpreted in a direct manner. As a result, the masking agent 175 may provide an intelligent two-way masking mechanism that secures the information in manner that may be abstracted from other components within the system.

Figure 4:
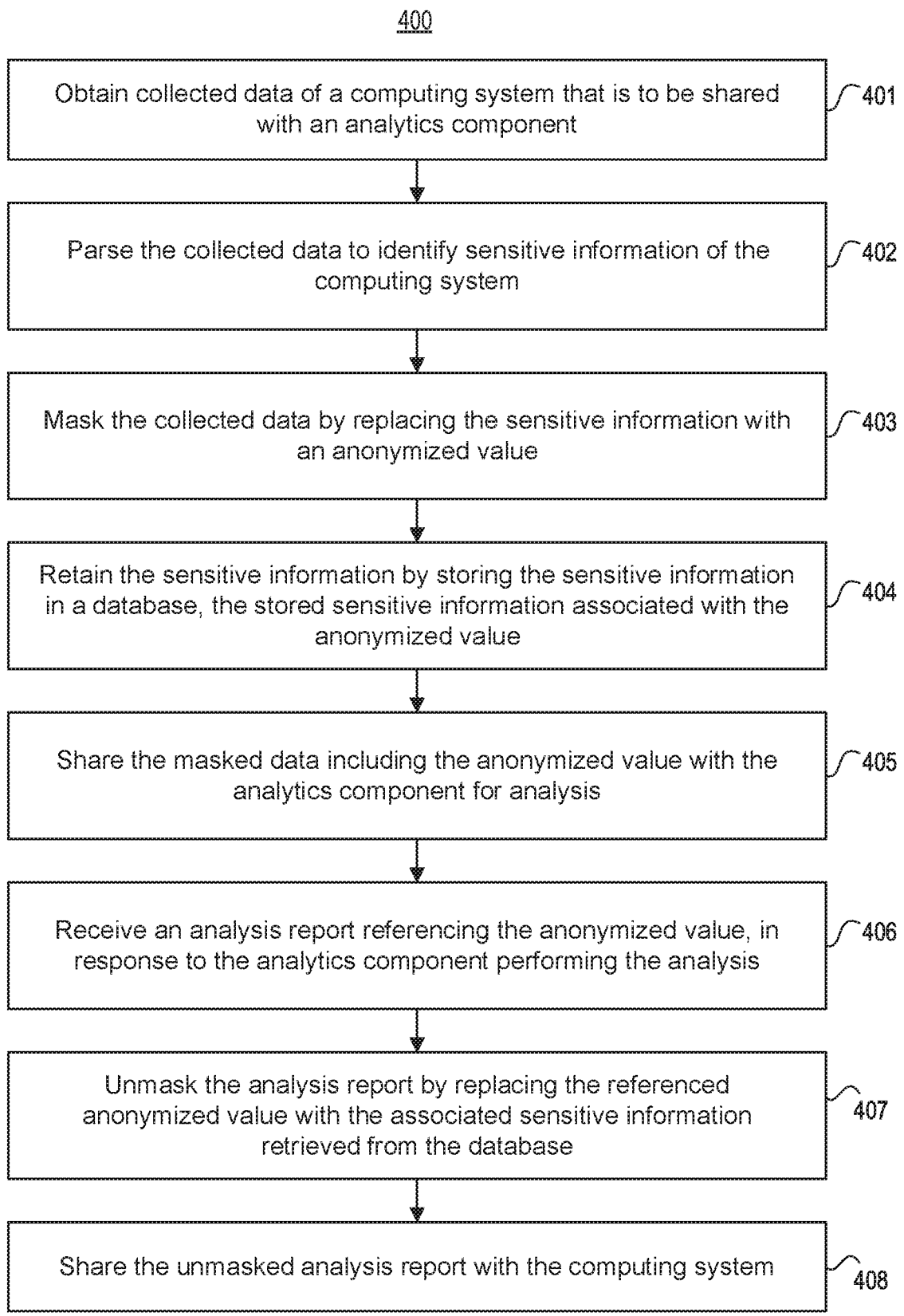
FIG. 4 is a flow diagram illustrating an example method of providing an intelligent data masking mechanism according to one or more embodiments of the disclosure.

FIG. 4 is a flow diagram 400 illustrating an example method of providing an intelligent data masking mechanism according to one or more embodiments of the disclosure. Process 400 may use processing logic, which may include software, hardware, or a combination thereof. For example, process 400 may be performed by a system including one or more components described in operating environment 100.

In 401, the system (e.g. masking agent) may obtain collected data (e.g. collected data 202) of a computing system (e.g. computing system 110) that is to be shared with an analytics component (analytics component 160). In some embodiments, the analytics component may be provided by a third-party. For example, the analytics component may be part of a cloud-based service (e.g. SaaS). In some embodiments, the system may identify the data by intercepting data stored in a structured document (or database, data store, etc.) that is to be sent to the analytics component. Accordingly, in some embodiments, the masking process may be performed in a manner that is abstracted from the computing system and/or the analytics component.

In 402, the system may parse the collected data to identify sensitive information (e.g. sensitive information 203) of the computing system. For example, the system parse (or locate) certain fields of a structured document (or database, data store, etc.) that is used to store and share the collected data. In some embodiments, the system may select certain fields and related information in an automated manner based on machine learning (ML) techniques. For example, when determining types of information that may be deemed sensitive, the system may also work in conjunction with a machine learning component (or process, encoding, etc.) that determines types of information that are flagged (or indicated, marked, etc.) as sensitive based on information (e.g. statistics, settings, etc.) gathered from other customers. Accordingly, the system may leverage crowd-sourced data sensitivity information. Moreover, the masking agent may be implemented as a service (e.g. SaaS), and accordingly, may be continuously updated to identify new types of sensitive data.

In some embodiments, the process of identifying sensitive information may be fully, or at least partially, automated. For example, a user may specify certain types of information to mask, and the system may perform an intelligent processing (e.g. ML-based) to determine which values of the collected data constitute the specified types of information. For example, a user may select server names as sensitive information, and the system may automatically determine values (or text) that are server names. In some embodiments, the system may performing a matching of text (or words) with a dictionary (or custom dictionary) to determine if a portion of text includes a name. For example, if a text string does not appear in the dictionary, the system may determine there is high probability the string corresponds to an identifier (e.g. name) of a component.

As described, in some embodiments, parsing the collected data to identify sensitive information may include identifying a name associated with a component. For example, the sensitive information may include a name (or device ID) associated with a component such as a device, VM, server, host, storage device, or other type of component. In addition, the parsing may including identify a name associated with other types of information such as a file, directory, volume, etc. For example, sensitive information may include a file or directory name as well as associated metadata such as author, file size, various dates or times such as a creation date, last modified date, last accessed date, etc., comments, tags, title, etc.

In some embodiments, parsing the collected data to identify sensitive information may also include identifying an address associated with a component. For example, the address may include a network address such as an IP address, MAC address, or any other type of address.

In some embodiments, parsing the data to identify sensitive information may also include identifying information indicative of a physical or virtual location of a component. For example, geographic data (e.g. region or zone information, or information indicating a city or state) may be identified as sensitive.

Accordingly, in some embodiments, parsing the collected data may include identifying a first portion of the sensitive information corresponding to contextual information, and identifying a second portion of the sensitive information corresponding to an identifier of a first component of the computing system. In some embodiments, the contextual information may be an identifier for a type of component (e.g. a type of server, storage device, network, etc.), and the identifier of the first component may be a name (or device ID) of the first component. For instance, using the example of diagram 200, the system may identify the mail server ("POTUS.mail.gov") as sensitive information. Accordingly, the system may identify ("mail.gov") as the first portion corresponding to contextual information, which in this example, includes a type of server (e.g. mail server). In addition, the system may identify ("POTUS") as the second portion corresponding to an identifier (e.g. name) of the mail server.

In some embodiments, the contextual information may be a network or subnetwork address, and the identifier of the first component may be a host (or host address). For instance, using another example of diagram 200, the system may identify the IP address ("192.2.11.1/24") as sensitive information. Accordingly, the system may identify ("192.2.11.0") as the first portion corresponding to contextual information, which in this example, includes a network (or subnetwork). In addition, the system may identify ("1") as the second portion corresponding to an identifier of the host (e.g. host address).

In 403, the system may mask the collected data by replacing the sensitive information with an anonymized value (e.g. anonymized value 205). In some embodiments, masking the collected data by replacing the sensitive information with the anonymized value may include preserving (or retaining) a portion of the sensitive information to preserve (or retain) contextual information related to a component. For example, the system may replace the particular name of a mail server, but preserve information indicating the server is a mail server. As described, in some embodiments, the system may divide the sensitive information into portions and mask the individual portions separately. Accordingly, one or more of the individual portions may be shared by another component to provide an indication of a relationship between components. For example, the system may mask a first portion of an IP address associated with a network (or subnetwork) using a first anonymized value that is shared with other components within the same network, and mask a second portion of the IP address associated with a host identifier using a second anonymized value that is unique to the host. Accordingly, contextual information such as subnetwork is preserved so that the analytics component may provide analysis for the individual hosts and the associated network.

Accordingly, in some embodiments, replacing the sensitive information with the anonymized value may include replacing the first portion of the sensitive information corresponding to contextual information with a first anonymized value shared with at least a second component of the computing system, and replacing the second portion of the sensitive information corresponding to the identifier of the first component with a second anonymized value to distinguish the first component from the second component. For instance, using the example of diagram 200, the system may replace the first portion ("192.2.11.0") of the sensitive information corresponding to contextual information (e.g. network subnetwork) with a first anonymized value ("98.129.215"). In addition, the anonymized value ("98.129.215") is shared with the other two IP addresses/host devices. The system may also replace the second portion ("1") of the sensitive information corresponding to the identifier of the first component with a second anonymized value ("27") to distinguish the first component from at least a second component (e.g. "27" used to distinguish from components anonymized as "8" or "211").

In 404, the system may retain the sensitive information by storing the sensitive information in a database (e.g. database 180). In some embodiments, the stored sensitive information may be associated with the anonymized value. For example, the sensitive information may be stored with the anonymized value as a key-value pair. In some embodiments, only the masking agent may be granted access to the database. For example, the database may be encrypted with only the masking agent having access to the decryption key.

In 405, the system may share the masked data (e.g. masked data 204) including the anonymized value with the analytics component for analysis. For example, in response to the receiving the masked data, the analytics component may perform an analysis of the computing system including an analysis of the components associated with the anonymized value.

In 406, the system may receive an analysis report (e.g. analysis report 302) referencing the anonymized value from the analytics component. For example, the system may receive the analysis report in response to the analytics component performing the analysis. As described, the analysis report may include particular metrics associated with certain components (e.g. servers, networks, applications, etc.) of the computing system. For example, the metrics may include information related to processing (e.g. processing load, time, usage, etc.), storage (e.g. efficiency, capacity, response time, access time), networks (e.g. bandwidth), power consumption, load balancing, and any other metrics that may be used to provide insights on the functioning or configuration of individual components or a computing environment.

In 407, the system may unmask the analysis report by replacing the referenced anonymized value with the associated sensitive information retrieved from the database. For example, the system may identify an anonymized value by performing a match with values already stored in the database. Upon finding a match, the system may then retrieve the corresponding sensitive information from the database. Accordingly, the retrieved sensitive information may be replaced with the corresponding anonymized value to create an unmasked report (e.g. unmasked report 304).

In 408, the system may share the unmasked analysis report with the computing system (e.g. user associated with the computing system). For example, the unmasked report may be shared in some manner such as via a dashboard, and access may be granted to authorized users. In some embodiments, the system may work in conjunction with the analytics component to unmask the report in a secure manner and then allow the analytics component to provide (e.g. publish) the unmasked report (e.g. via a dashboard). In some embodiments, the unmasked report may only be shared (e.g. revealed) within the secure environment (e.g. secure environment 120). For example, only user accounts with access to the secure environment, or components therein, may access (e.g. view, download, etc.) the unmasked report. Accordingly, in some embodiments, the process provides and intelligent and reversible data masking of computing environment information shared with the analytics component.

Figure 5:
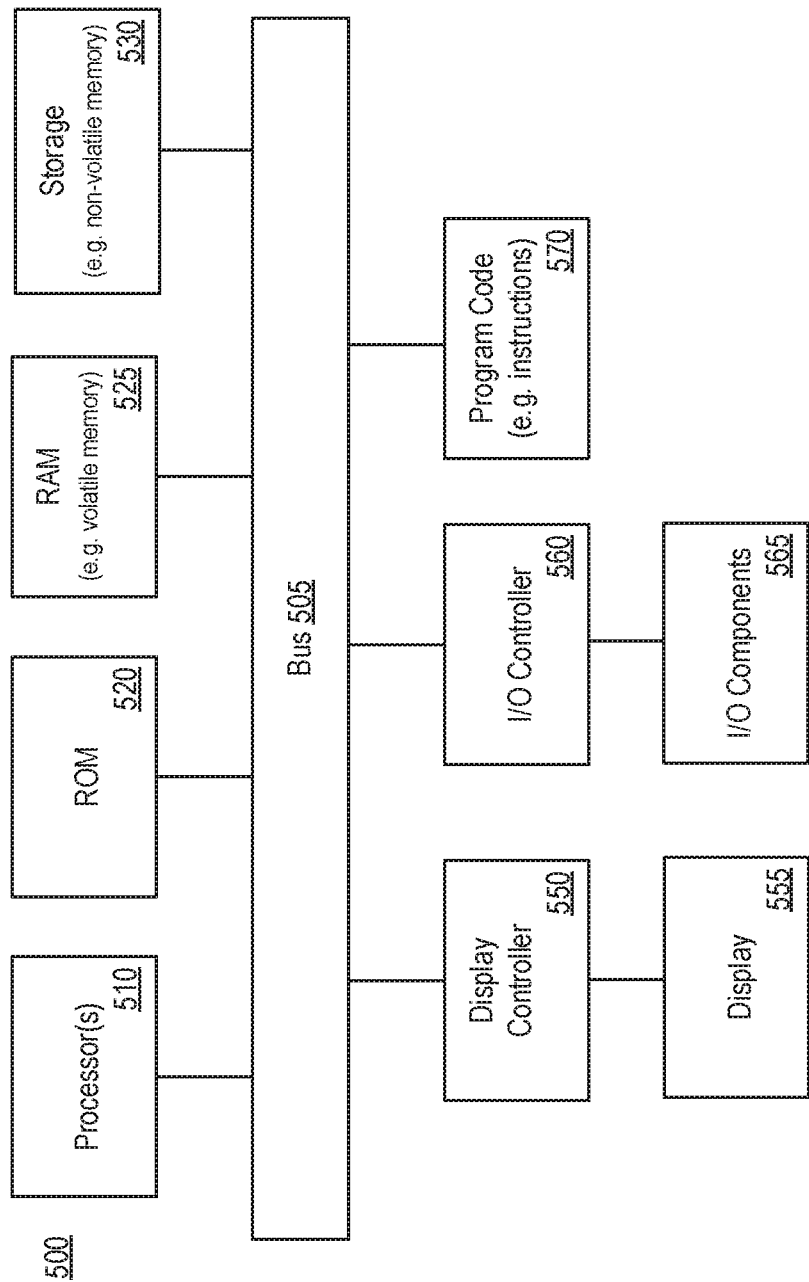
FIG. 5 is a block diagram illustrating an example computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. computing system 110, masking agent 175, analytics component 160, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. masking agent 175, analytics component 160, analytics agent 160, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising: one or more processors; and a non-transitory computer readable medium storing a plurality of instructions, which when executed, cause the one or more processors to: obtain, by a masking agent, collected data of a computing system that is to be shared with an analytics component for analysis, the collected data including information associated with a functioning or configuration of components of the computing system; parse, by the masking agent, the collected data to identify sensitive information and contextual information of the computing system, wherein identifying the sensitive information includes a machine-learning process determining whether any unmodified value of the collected data constitutes a type of information specified by an end user as a subset of the sensitive information to mask; mask, by the masking agent, the collected data by replacing the sensitive information with anonymized values and retaining the contextual information, the retained contextual information is used to derive relationships between components of the computing system; retain, by the masking agent, the sensitive information by storing the sensitive information in a database, the stored sensitive information associated with the anonymized values; share, by the masking agent, the masked data and the retained contextual information including the anonymized values with the analytics component for analysis of the functioning of the computing system using the derived relationship between the components of the computer system; response to the analytics component performing the analysis of the functioning of the computing system; unmask, by the masking agent, the analysis report by replacing the referenced anonymized values with the associated sensitive information retrieved from the database; and share, by the masking agent, the unmasked analysis report with the computing system.

2. The system of claim 1, wherein parsing the collected data to identify sensitive information includes:
   identifying a first portion of the sensitive information corresponding to the contextual information; and
   identifying a second portion of the sensitive information corresponding to an identifier of a first component of the computing system.

3. The system of claim 2, wherein replacing the sensitive information with the anonymized values includes:
   replacing the first portion of the sensitive information corresponding to the contextual information with a first anonymized value shared with at least a second component of the computing system; and
   replacing the second portion of the sensitive information corresponding to the identifier of the first component with a second anonymized value to distinguish the first component from the second component.

4. The system of claim 3, wherein the contextual information corresponding to the first portion of the sensitive information comprises an identifier for a type of component, and the identifier of the first component corresponding to the second portion of the sensitive information comprises a name of the first component.

5. The system of claim 3, wherein the contextual information corresponding to the first portion of the sensitive information comprises a network or subnetwork address, and the identifier of the first component corresponding to the second portion of the sensitive information comprises a host address.

6. The system of claim 1, wherein storing the sensitive information in the database includes storing the sensitive information and the associated anonymized values as key-value pair.

7. The system of claim 1, wherein only the masking agent is granted access to the database.

8. A method comprising: obtaining, by a masking agent, collected data of a computing system that is to be shared with an analytics component for analysis, the collected data including information associated with a functioning or configuration of components of the computing system; parsing, by the masking agent, the collected data to identify sensitive information and contextual information of the computing system, wherein identifying the sensitive information includes a machine-learning process determining whether any unmodified value of the collected data constitutes a type of information specified by an end user as a subset of the sensitive information to mask; masking, by the masking agent, the collected data by replacing the sensitive information with an anonymized value and retaining the contextual information, the retained contextual information is used to derive relationships between components of the computing system; retaining, by the masking agent, the sensitive information by storing the sensitive information in a database, the stored sensitive information associated with the anonymized value; sharing, by the masking agent, the masked data and the retained contextual information including the anonymized values with the analytics component for analysis of the functioning of the computing system using the derived relationship between the components of the computer system; receiving, by the masking agent, an analysis report referencing the anonymized value, in response to the analytics component performing the analysis of the functioning of the computing system; anonymized value with the associated sensitive information retrieved from the database; and sharing, by the masking agent, the unmasked analysis report with the computing system.

9. The method of claim 8, wherein parsing the collected data to identify sensitive information includes:
  identifying a first portion of the sensitive information corresponding to the contextual information; and
  identifying a second portion of the sensitive information corresponding to an identifier of a first component of the computing system.

10. The method of claim 9, wherein replacing the sensitive information with the anonymized values includes:
  replacing the first portion of the sensitive information corresponding to the contextual information with a first anonymized value shared with at least a second component of the computing system; and
  replacing the second portion of the sensitive information corresponding to the identifier of the first component with a second anonymized value to distinguish the first component from the second component.

11. The method of claim 10, wherein the contextual information corresponding to the first portion of the sensitive information comprises an identifier for a type of component, and the identifier of the first component corresponding to the second portion of the sensitive information comprises a name of the first component.

12. The method of claim 10, wherein the contextual information corresponding to the first portion of the sensitive information comprises a network or subnetwork address, and the identifier of the first component corresponding to the second portion the sensitive information comprises a host address.

13. The method of claim 8, wherein storing the sensitive information in the database includes storing the sensitive information and the associated anonymized value as key-value pairs.

14. The method of claim 8, wherein only the masking agent is granted access to the database.

15. A computer program product comprising a non-transitory computer-readable medium having a computer-readable program code embodied therein to be executed by one or more processors, the program code including instructions to: obtain, by a masking agent, collected data of a computing system that is to be shared with an analytics component for analysis, the collected data including information associated with a functioning or configuration of components of the computing system; parse, by the masking agent, the collected data to identify sensitive information and contextual information of the computing system, wherein identifying the sensitive information includes a machine-learning process determining whether any unmodified value of the collected data constitutes a type of information specified by an end user as a subset of the sensitive information to mask; mask, by the masking agent, the collected data by replacing the sensitive information with anonymized values and retaining the contextual information, the retained contextual information is used to derive relationships between components of the computing system; retain, by the masking agent, the sensitive information by storing the sensitive information in a database, the stored sensitive information associated with the anonymized values; share, by the masking agent, the masked data and the retained contextual information including the anonymized values with the analytics component for analysis of the functioning of the computing system using the derived relationship between the components of the computer system; receive, by the masking agent, an analysis report referencing the anonymized values, in response to the analytics component performing the analysis of the functioning of the computing system; anonymized value with the associated sensitive information retrieved from the database; and share, by the masking agent, the unmasked analysis report with the computing system.

16. The computer program product of claim 15, wherein parsing the collected data to identify sensitive information includes:
  identifying a first portion of the sensitive information corresponding to the contextual information; and
  identifying a second portion of the sensitive information corresponding to an identifier of a first component of the computing system.

17. The computer program product of claim 16, wherein replacing the sensitive information with the anonymized values includes:
  replacing the first portion of the sensitive information corresponding to the contextual information with a first anonymized value shared with at least a second component of the computing system; and
  replacing the second portion of the sensitive information corresponding to the identifier of the first component with a second anonymized value to distinguish the first component from the second component.

18. The computer program product of claim 17, wherein the contextual information corresponding to the first portion of the sensitive information comprises an identifier for a type of component, and the identifier of the first component corresponding to the second portion of the sensitive information comprises a name of the first component.

19. The computer program product of claim 17, wherein the contextual information corresponding to the first portion of the sensitive information comprises a network or subnetwork address, and the identifier of the first component corresponding to the second portion the sensitive information comprises a host address.

20. The computer program product of claim 15, wherein storing the sensitive information in the database includes storing the sensitive information and the associated anonymized value as a key-value pair.

* * * * *